Patented Nov. 12, 1929

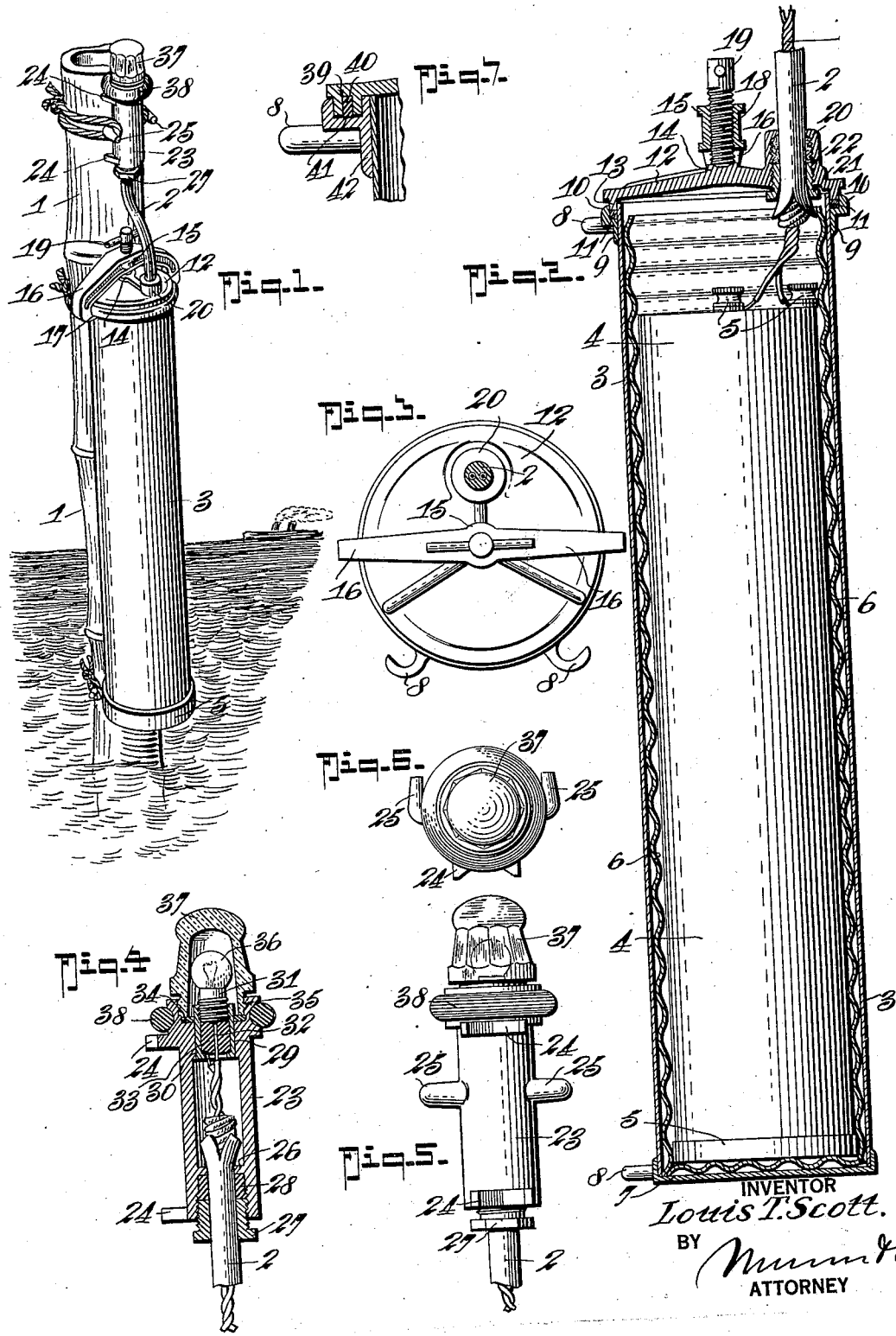

1,735,797

UNITED STATES PATENT OFFICE

LOUIS T. SCOTT, OF SEATTLE, WASHINGTON

MARINE SIGNAL LIGHT

Application filed June 18, 1927. Serial No. 199,762.

This invention relates to signal lights and is more particularly concerned with portable signal lights for marine use adapted to mark and therefore to signal the location of buoys, dories, channel stakes, fishing gear, etc.

The invention provides novel constructions particularly adapting the outfit to marine use, including structural combinations ensuring its effective operation under adverse conditions. While particularly adapted to marine use, it is not restricted thereto, its portable nature making it useful generally where a marking or signal light is needed.

The various features of my invention are more particularly pointed out in the following detailed specification and claims and are illustrated in the accompanying drawings forming part thereof and in which a preferable embodiment of the invention is shown.

In these drawings:

Figure 1 is a perspective view illustrating the signal light as mounted upon a location stake in the water, Figure 2 is a vertical section on an enlarged scale, through the battery case, Figure 3 is a top plan view of the battery case, Figure 4 is a vertical section through the light holder, with the light socket shown in section, Figure 5 is a side elevation of said holder, Figure 6 is a top plan view thereof, and Figure 7 is a detail section illustrating a modified form of gasket closure for the top of the battery case.

The battery case and light holder are separate structurally and are each provided with means whereby they may be secured to a suitable support such as the pole or stake 1, projecting above the water and marking the location of a buoy, channel, dory anchorage or fishing gear. The battery case and light holder are of water-proof construction and are connected by a flexible electric cable 2.

The battery case 3, of non-corroding metal, is cylindrical in form to house a single battery unit 4 which may be formed of a plurality of dry cells connected in series with their common terminals 5 on the top of the unit 4. Corrugated packing 6 at the bottom and sides of the case encloses the battery unit within the case, the bottom of which is securely closed by a flanged end 7. At the bottom and top of the case; spaced hooks 8, best seen in Fig. 3 provide means for lashing the case to a suitable support such as the pole 1.

A collar 9 is rigidly attached to the outside of the case 3 at its top and is formed with an outwardly offset flange 10 providing a channel between it and the side of the case at the top in which a gasket 10 of rubber or other suitable material is seated. A cover 12 for the top of the case is provided with an annular flange 13 seating over said gasket 11 and forced down thereon to provide a water-tight connection by clamping means which will be now described. The upper face of the cover 12 centrally thereof is provided with an integral boss 14 providing a socket in which the lower smooth end of a clamping screw 15 seats. A yoke 16 is provided with depending hooks 17 engaging under the flange 10 of the collar 9 of the battery case and centrally thereof is formed with a threaded collar 18 through which the clamping screw 15 is threaded. A bar 19 extends through the head of the clamping screw and forms a convenient handle by means of which the screw may be turned to draw the hooked ends 17 of the clamping yoke up against the flange 10 on the upper end of the battery case, this action through the lower end of the screw forcing the cover flange 13 firmly down upon the gasket 11 compressing it and rendering the upper end of the case 3 water-proof.

Adjacent to its edge the cover 12 is provided with an upstanding stuffing box 20, internally threaded to receive the stuffing gland 21 which is inserted from the underside of the cover. One end of the electric light cable 2 is inserted through the stuffing box, its wires being connected to the two terminals 5 of the battery unit 4. The interior of the stuffing box 20 is filled with packing 22 which is compressed by the gland 21 to make a water tight packing about the cable.

The light holder to which the cable 2 is led, provides a novel and advantageous structure comprising a tubular casing 23 preferably of aluminum and brass, having spaced lugs 24 at its top and bottom to seat against a support such as the pole 1 and at an intermediate point is provided with hooks 25 by means of which it may be lashed to and held upon the support 1. The lower end of the holder is open and a stuffing box is provided by a centrally apertured web 26 within the holder adjacent to its lower end which is internally threaded to receive the gland 27. The upper end of the electric cable 2 is inserted through the gland and web opening and extends up into the interior of the holder. Suitable packing compressed by the gland against the web makes the lower end of the holder water tight. Adjacent to the upper end of the holder, its internal diameter is reduced at 29 to correspond to the diameter of and form a snug seat for a socket for a small electric bulb of the "miniature" class, and which, in the particular wiring of the socket is of the single contact variety. To withstand the effect of damp and salt air, this socket is of a special and particularly advantageous construction. The exterior case 30 is of brass, internally threaded at its top to receive the threaded base of the electric bulb 31 and provided with a contact plug 32 of Monel metal extending down through and insulated from the base of the case and soldered or otherwise appropriately connected to the ends of one of the two wires enclosed and carried by the cable. The end of the other wire is soldered or otherwise grounded on the case. Insulation 33, preferably of bakelite fills and is crimped into the bottom of the case below the upper end of the Monel contact 32. Obviously the circuit is grounded in the case 30, by one wire and current is carried through the metal base of the bulb, through the filament and back through its single contact engaging the Monel metal contact plug.

Above the seat 29 for the bulb, the upper end of the case 30 is enlarged in diameter externally and internally and is internally threaded. An annular seat 34 is thus formed between the threaded portion and the side of the bulb base in which a rubber or similar gasket 35 fits. The light bulb is protected and enclosed by a heavy glass lens 36 of familiar insulator form, the lower threaded end of which screws into the internally threaded upper end of the holder 23 and forces gasket 35 down hard on its seat making a water tight joint.

This lens is of particular construction and is especially advantageous not only in that it is relatively thick and heavy, fully encloses the bulb and thus affords substantial protection, but through having facets cut or formed on its side faces, it acts as a prismatic lens and makes the light of the small electric bulb visible for a distance of several miles at night at all points of the circumference. This prismatic lens is therefore of especial importance in a small signal light inasmuch as it makes possible and practical the use of a small outfit of this character where ordinarily a much larger one would be required for this purpose. In other words a signal outfit of relatively low battery capacity and a light of correspondingly low candle power will take the place of a higher powered outfit and will have long life since the light through the prismatic lens is greatly increased in power and radiation without increasing the normal low rate of current consumption.

To protect the holder with its lens and bulb against breakage and the bulb from harmful jar or shock, the exterior of the holder case 23 at its top is formed with an annular groove in which is seated a rubber bumper ring 38.

The construction of battery case and light holder is such as to provide these enclosing members with water tight joints and connections. The described connections represent preferable forms but obviously are subject to change without departing from the spirit of my invention. For example as shown in Figure 7, the cover 12 of the battery case may have its lower edge thickened and provided with an annular recess in which a gasket 40 seats, the gasket and cover edge being forced down into the annular channel 41 on the flanged collar 42 at the top edge of the battery case.

The described construction of marine light is also particularly desirable because of its portable nature and provision for attachment to almost any object. While I have herein described and shown specific forms and constructions representing a preferable embodiment of the invention, it is to be understood that these are susceptible of change and variation within the spirit of the invention and the scope of the appended claims.

Having thus described my invention what I claim and desire to secure by Letters Patent is:

1. A marine spar buoy signal light assembly comprising a tubular water proof battery casing having lashing hooks externally thereof adjacent its opposite ends and an electric cable packing gland therein, a battery unit housed therein, a tubular water proof light holder casing separate therefrom having a light socket in its upper end and lashing hooks externally thereof, an electric light bulb in said socket, an enclosing annular prismatic lens affixed to the casing, a packing gland in the lower end of said tubular light casing, and a flexible water proof electric cable interposed between the battery and light casings with its ends extending through their said packing glands and electrically connected with the battery terminals and light socket terminals, respectively.

2. A marine spar buoy signal light assembly comprising a tubular water proof battery casing having a removably clamped end closure formed with a cable packing gland therein and having lashing abutments outstanding therefrom adjacent to its opposite ends, a battery unit housed in said casing having its terminal connections adjacent said removable end closure, a tubular water proof light holder casing separate from the battery casing having a light socket in its upper end and a cable packing gland in its lower end and provided externally with lashing abutments outstanding laterally therefrom and with a lateral spar engaging offset, a miniature electric light bulb in said socket, a cupped glass lens affixed to the upper end of the casing, and a flexible water proof electric cable interposed between the battery and light casing with its ends extended through their respective packing glands and electrically connected with the battery and light socket terminals, respectively.

3. A spar mounting signal light assembly comprising a tubular battery casing having spar lashing hooks externally thereof offset laterally therefrom and having a cable opening therethrough, a dry battery unit within said casing, a separate tubular light holder casing having a light socket in one end and a cable opening in its other end and provided externally with laterally offset spar lashing hooks, a miniature electric bulb in said socket and a cupped prismatic lens affixed to and closing the upper end of said casing and enclosing said bulb and projecting magnified beams of light therefrom and a flexible electric cable between said battery and light holding casings having its ends extended through the lower end of the tubular light holding casing and through the cable bore in the battery casing and electrically connected respectively with the terminals of the light socket and the terminals of the battery in the respective casings.

4. A marine spar buoy signal light assembly comprising a tubular water proof battery casing having lashing abutments externally thereof laterally offset therefrom adjacent its opposite ends and having a cable packing gland in one end, a dry battery unit housed in said casing having its terminal connections adjacent said packing gland, a separate tubular light holder casing having a light socket in its upper end and a cable packing gland at its lower end and formed externally with laterally offset lashing abutments and with an outstanding spar engaging offset, a miniature electric bulb in said light socket, a cupped glass lens closing the upper end of said casing and enclosing the light bulb to radiate a complete circle of light therefrom, and a flexible cable interposed between said battery and light casings and having its ends extended through their cable packing glands and electrically connected respectively to the terminals of the light socket and battery in the respective casings.

5. In a signal light assembly comprising a light holding casing and a separate battery holding casing interconnected by a flexible electric conductor, a tubular water proof battery casing having a permanently closed lower end, and a flanged upper end having an annular packing groove therein providing an annular seat, and a removable end closure for said end having an annular packing rib seating in said flange groove and having in its face within its outer edges a battery cable stuffing box provided with a packing gland upon the inner face of the end closure, and means mounted on said end closure to engage beneath said casing flange and removably clamp to end closure thereto.

6. In a device of the character described, a tubular light holding casing having a light socket in one end and an external annular groove adjacent thereto, and having external laterally oustanding lashing abutments, a miniature electric bulb in said socket, a cupped lens closing the upper end of said holder and enclosing said bulb, and an annular bumper ring of resilient material mounted in said external annular groove and outstanding from said casing.

7. In a device of the character described, a tubular light holding casing of insulating material having a light socket in one end thereof and an annular lens seat concentric therewith, and a cable receiving stuffing box in the other end thereof, said socket being formed of a cupped metal casing threaded at its upper end to receive the base of an electric bulb and filled with insulating material, an electric conductor extending through said material from the base of said casing and having a terminal contact at the base of said threaded bulb socket, with said metal socket casing constituting a second current conductor and its threaded light socket end a contact.

LOUIS T. SCOTT.